United States Patent [19]
Becker

[11] 3,917,471
[45] Nov. 4, 1975

[54] INSULATING FLEXIBLE COMPOSITE ELEMENT AND PURGE SYSTEM

[76] Inventor: Otto Alfred Becker, Robert-Koch-Strasse 59, 66 Saarbruecken 6, Germany

[22] Filed: May 1, 1974

[21] Appl. No.: 465,848

Related U.S. Application Data

[62] Division of Ser. No. 125,549, March 18, 1971, Pat. No. 3,811,239.

[52] U.S. Cl. .................. 55/267; 55/316; 55/388; 52/406; 52/615
[51] Int. Cl.² .................................... B01D 51/00
[58] Field of Search...... 55/267, 316, 385, 387–389; 52/172, 303, 309, 406, 615

[56] References Cited
UNITED STATES PATENTS

| | | | |
|---|---|---|---|
| 3,264,165 | 8/1966 | Stickel | 52/406 |
| 3,803,784 | 4/1974 | Becker | 52/615 |
| 3,811,239 | 5/1974 | Becker | 55/316 |
| 3,811,239 | 5/1974 | Becker | 52/406 |
| 3,834,096 | 9/1974 | Becker | 52/172 |

*Primary Examiner*—Bernard Nozick
*Attorney, Agent, or Firm*—Erich M. H. Radde

[57] ABSTRACT

An improved heat and cold insulating flexible composite element comprises at least one radiation chamber with walls of flexible material having reflecting surfaces. Opposite walls of said chamber are resiliently spaced from each other by suitable spacing elements. Preferably the chambers are enclosed by an envelope which may also be formed of flexible reflecting sheets.

5 Claims, 6 Drawing Figures

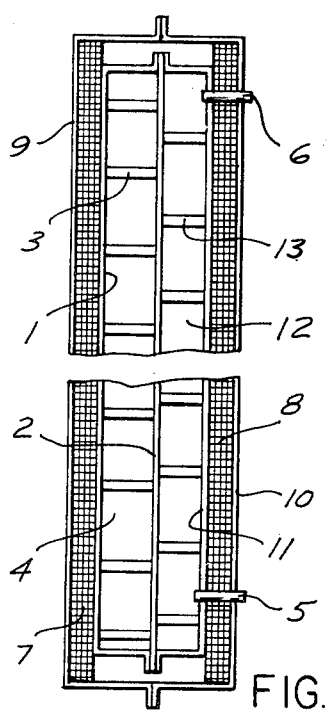
FIG. 1
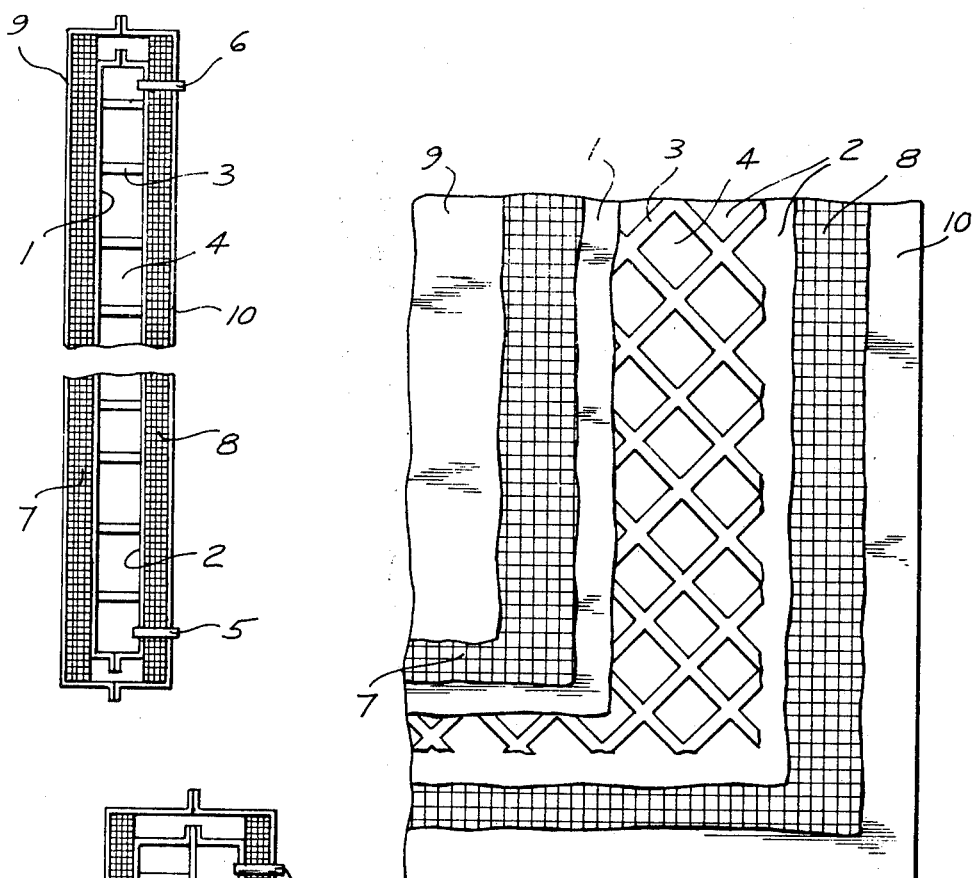
FIG. 2
FIG. 3

INSULATING FLEXIBLE COMPOSITE ELEMENT AND PURGE SYSTEM

This is a division, of application Ser. No. 125,549 filed Mar. 18, 1971 now U.S. Pat. No. 3,811,239 issued May 21, 1974.

BACKGROUND OF THE INVENTION

1. Field of the Invention

The present invention relates to flexible composite elements and more particularly to flexible composite elements useful as heat and cold insulating structures of improved heat and cold insulating power.

2. Description of the Prior Art

Flexible composite elements have been made and used heretofore to provide heat or cold insulation. Such elements composed of textile fabrics, wool, plastic foam material, and the like have been employed as material for curtains, blinds, and shades, tents, and the like as well as for wall and floor coverings, ceilings, and the like structural material, and also for cushions, bed covers, articles of clothing, and the like. The known flexible composite elements of this type, however, did not fully meet the requirements of satisfactory heat and cold insulation.

SUMMARY OF THE INVENTION

It is, therefore, an object of the present invention to provide flexible composite elements of considerably improved heat and cold insulating power.

Other objects of the present invention and advantageous features thereof will become apparent as the description proceeds.

Said objects of the present invention are achieved by preventing the transfer of thermal energy by heat radiation by means of highly reflective, metallized reflector foils and radiation chambers associated with them, while substantially limiting thermal conduction. As reflector foils there are preferably used thin, flexible plastic sheets with pure-metal aluminum coatings applied by vacuum vaporization. They reflect the heat rays impinging them to the extent of about 90% and radiate off only about 10% of the energy taken up. By flexible, insulating spacers, consisting preferably of soft, elastic plastic foam blankets which are perforated or slit and then expanded, radiation chambers for the reflector sheets are formed. By the perforating or slitting of the insulating agent, the chamber walls are reduced to thin foam ribs. The chambers are small and tightly sealed-off so that no convection of the air can take place.

A single flexible reflector sheet and an insulating blanket forming radiation chambers are by themselves sufficient to obtain a good insulation. Insulating chambers can also be arranged on both sides of the reflector sheet, or else insulating chambers can be closed- off by sheets on both sides, after which one insulating chamber and one reflector sheet each can alternately follow. In this way highly effective insulations are obtained.

Since heat reflection is practically eliminated by precipitation of water of condensation on the reflector sheets, it is advisable, depending on the nature of the use of the flexible composite element, to close the composite element off hermetically from the outside. This can be effected in the manner that the outer reflector sheets which bear the insulating agent, reflector sheets, and radiation chambers between them are combined with each other to form a hermetically closed envelope, sheath, or casing. Dry air or a dry gas, for instance, nitrogen, is introduced into said envelope preferably with pressure in the composite element. By metallizing both sides of the plastic sheet, the envelope is rendered practically impervious to vapor. Such reflector envelopes can in addition be protected from mechanical injury by another envelope, for instance, by an envelope of articifical leather or an envelope of other decorative sheets or, for instance of tent cloth, preferably with the interposition of a wide-mesh fabric, or perforated, soft plastic foam. The hermetically closed flexible envelopes can be provided with valves which make possible filling or renewal of the dry air or of a gas at any time. Furthermore, replaceable, hermetically arranged, perforated plastic tubes filled with air-drying substances, for instance, calcium chloride, can also be introduced into the flexible composite elements. This can be effected, for instance, with perforated double tubes, one of which, extending towards the inside of the composite element, is hermetically sealed and joined to the hermetically closed envelope, while the other tube is inserted thereinto in replaceable fashion and in such a manner that it is sealed off hermetically against the outside.

It is advantageous to be able to stretch or tension the composite elements, for instance, tent cloths, wall coverings, and the like, in order to hold the reflector sheets spaced apart by the chamber ribs.

This can be effected in many different manners. For this it is advisable to tension the envelopes, for instance, by stiffening or reenforcing means, which are introduced detachably in frame-like fashion into the edge portions of the envelopes which are folded over. By tensioning the envelope, the inner elements, and particularly the reflector sheets and spacers which are preferably fastened on top and on bottom and, if desired, on the sides with tension springs or rubber bands or the like, are also tensioned if their size is maintained correspondingly smaller than that of the envelope.

Fine nettings of insulating material can also be provided on both sides of the flexible spacers and they may preferably also be tensioned so as to secure the chambers from penetration of the reflector sheets.

When using the composite elements for building purposes, the individual envelopes can be connected to each other by tubular conduits which are, for instance, connected via a main conduit with an air-drying system. This air-drying system permits the inward and outward flow of the air contained in the envelopes. As a result thereof newly entering atmospheric air has its moisture content reduced by the air-drying system to such an extent that no water of condensation can form. Protection against dust can also be obtained by means of suitably provided filters. This system can also be combined with an air pump to maintain the pressure in the flexible composite element as well as to pump outer air via the dust filter and the drying system into the composite element in the form of dry air. Thereby, the lighter, moist air present at the upper end of the composite element is discharged through an outlet valve preferably arranged at said upper end.

Air circulation can also be provided by connecting the upper valve tube with the pump system.

The volume of the envelope is dimensioned so large that the air on the inside can expand, upon heating, without change in pressure. The sheets can, for instance, be firmly connected at their edges with the spacer means.

All parts, for instance, the fabric, the plastic foam, and the like, of the composite element can be vapor-coated on all sides with aluminum so as to reflect.

DESCRIPTION OF THE DRAWINGS

The present invention will be explained hereinafter in further detail with reference to the attached drawings, in which FIG. 1 shows the composite element according to the present invention in cross-sectional view;

FIG. 2 is a top view of the composite element of FIG. 1, but with layers partially removed;

FIG. 3 is another embodiment of the composite element according to the present invention, also in cross-sectional view;

In said FIGS. like numerals designate like parts of the composite elements of this invention.

DESCRIPTION OF PREFERRED EMBODIMENTS OF THE INVENTION

Figure 4:
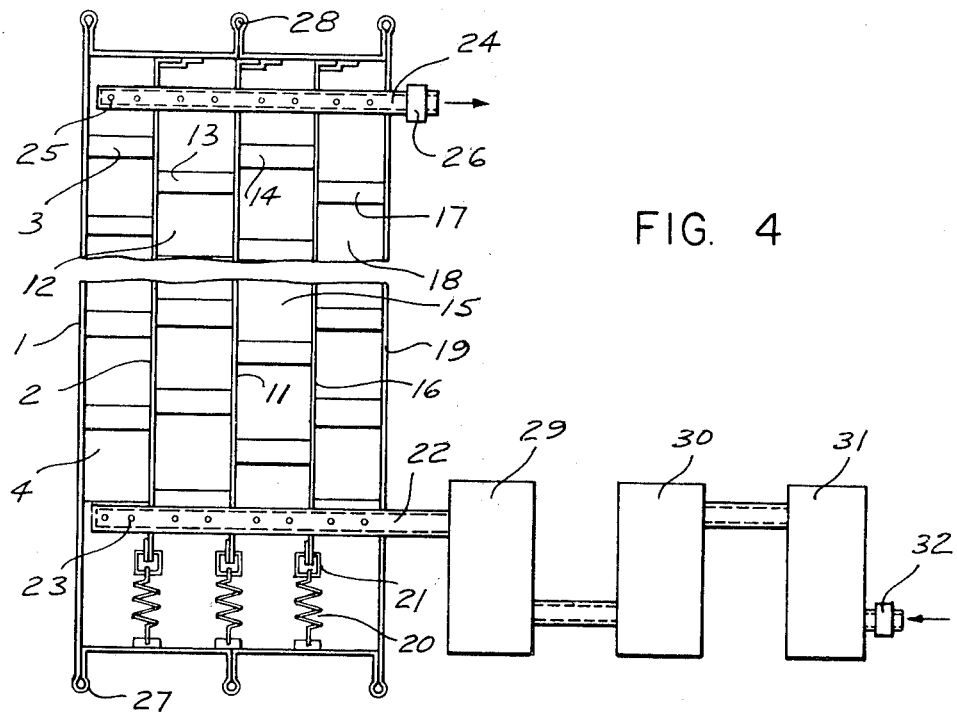
FIGS. 4 to 6 are further embodiments and details of composite elements according to the present invention.

FIG. 1 shows in vertical cross-sectional view two reflector sheets or foils 1 and 2 consisting, for instance, of plastic sheets both of the surfaces of which have been vapor-coated in a vacuum with a highly reflective layer of aluminum. A perforated or slit and expanded plastic foam cover 3 is arranged between the two reflector sheets 1 and 2 as spacer means forming insulating small radiation chambers 4. The reflector sheets 1 and 2 which preferably consist of plastic material coated by vaporization with aluminum on both sides, are connected and welded at their edges in air- and vapor-impervious manner to form an envelope or casing. The inner air is displaced and replaced by predried air through valves 5 and 6. For the protection of the envelope formed by sheets 1 and 2 and to prevent deposition of dust and precipitation of water of condensation, it is surrounded on all sides by a wide-mesh, grid-shaped fabric 7 and 8. Instead of a fabric, there can also be used, for instance, a flexible plastic foam sheet with or without perforations, and when not perforated, with strongly profiled surfaces, for instance, with protruding ribs extending in opposite directions on the two surfaces. This composite element is closed off and sealed on all sides from the outside by further similar or, for instance, decoratively printed plastic sheets or foils 9 and 10 the edges of which are also connected and sealed to form a hermetic envelope. In this connection the inner surfaces of the sheets 9 and 10 can also be coated by vapor deposition with highly reflective aluminum. The grid-shaped fabrics 7 and 8 thereby form radiation chambers containing quiescent air. At the same time they assure the spacing between the reflector sheets. All parts of the composite element are flexible. In this way changes in air pressure and temperature can be accommodated by corresponding change in volume. If the second envelope formed by sheets 9 and 10 also consists of reflector sheets coated with aluminum by vapor deposition, a third replaceable decorative envelope (not shown) can be provided.

Depending on the purpose which this composite element is to serve, for instance, as insulating covering for the walls of rooms, it may be advisable to connect the individual composite elements with a main pipeline or a hose line which in its turn is connected with an air-drying system. In this way, in case of change of volume in the envelope 1 and 2, air can escape via the drying system and, conversely, in case of cooling, dried air can be supplied again via the drying system to the envelope.

The air-drying system can consist, for instance, in known manner of a housing with insertable screens to receive air-drying agents, for instance, calcium chloride. Air cooling units of known type can also be provided for the removal of water vapor either alone or in addition. Valves can be associated with the composite element and the air-drying system. Thus, for instance, an upper valve can open upon an increase of the pressure in the composite element and a lower valve in case of a decrease of the pressure can allow additional air to enter via the air-drying system.

FIG. 2 shows the sequence of the layers of the composite element, commencing with the outer, for instance, decorative, protective sheet 9 and terminating with the opposite protective sheet 10. The top view of the foam cover 3 shows the expanded slits or the radiation chambers 4 formed thereby.

FIG. 3 is identical to FIG. 1, except for the insertion of a foam cover 13 forming further radiation chambers 12 and another reflector sheet 11 which is hermetically sealed to the reflector sheet 1 along the entire edge. There can be provided as required any desired number of insulating groups consisting of reflector sheets 1 and 2 and the spacer means forming radiation chambers 4 and 12 to increase the insulating effect.

The thin reflector sheets or foils and the fine surface coatings with vapor-deposited aluminum are of no special importance with respect to the heat conduction, despite the fact that the edges of the sheets or foils are joined to each other.

The same applies also to the outer sheet 9 and 10. The very soft foam layers 3 and 13 which are reduced to thin ribs, also conduct the heat to only a very slight and inconsiderable extent. Convection of the quiescent dry air enclosed in the chambers 4 and 12 is also practically excluded for energy transfer. The depth of the chambers 4 and 12 is preferably only about 10 mm. The wide-mesh, grid-shaped outer fabric 7 and 8 also composed of insulating material, transfers the heat from the outer sheet to the inner sheet only to a slight extent. If the foam covers or layers 3 and 13 and the fabric 7 and 8 are also vapor-coated with aluminum, then the insulating effect is further increased by reflection. The grid-shaped fabric 7 and 8 can also be made of other material, for instance, of rubber or cords or the like.

FIG. 4 shows in vertical cross-section the inner envelope of a flexible composite element having the envelope sheets 1 and 19 and the reflector sheets 2, 11, and 16 arranged between the spacers 3, 13, 14, and 17 and the chambers 4, 12, 15, and 18. The reflector sheets 2, 11, and 14 are held tight by springs 20 which act via clamps 21 on the lower sheet edge. The spacers 3, 13, 14, and 17 can also be tensioned in the same manner.

FIG. 4 shows a lower tube 22 which is provided with perforations 23 for the passage of dry air. At the upper end of the element there is inserted tube 24 with perforations 25, as well as valve 26 through which moist air can be let out.

The lower tube 22 is connected with an air-drying system 29 in front of which there is provided a dust filtering system 30. In addition there can be provided a pump 31 which draws in air via valve 32 and forces the air into the composite element via the dust filter 30 and the air-drying system 29. Since the moist air is lighter than dry air, it rises upward in the composite element and is forced out through valve 26 by the dry air entering at the bottom.

Figure 5:
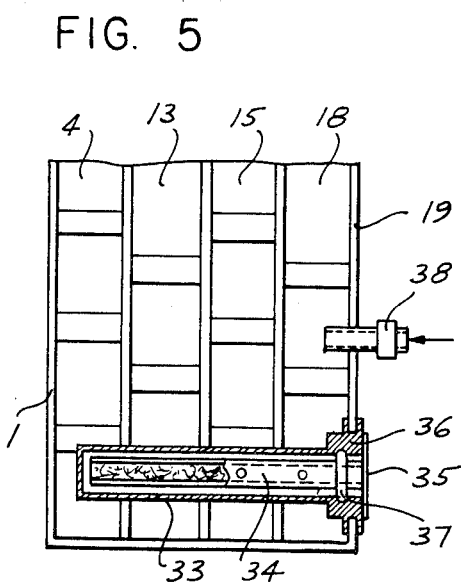

FIG. 5 shows the lower part of a tubular insert 33 which preferably is perforated towards the top and thereby allows the air to enter the inside of the tube. In this tube there is arranged a second tube 34 which also has corresponding perforations and contains air-drying agents, for instance, calcium chloride. The outer tube 33 is hermetically sealed to the envelope 19 and the inner tube 34 is provided with a closure cover 35 and an elastic part 36 which rests in hermetically sealing manner in a gasket 37.

In addition, an inlet valve 38 can also be provided at the lower part and a outlet valve in corresponding manner on the upper part. This for the purpose of filling the element in advance with dry air.

The pump can be omitted. Instead of it, there can be an open connection with the atmosphere.

Another possibility consists of connecting the upper tube 24 with the air pump by means of a corresponding length of tube and thus effecting circulation of air by the pump within the element, the moisture being removed from the moist air by the air-drying agents in the air-drying system 29.

Figure 6:
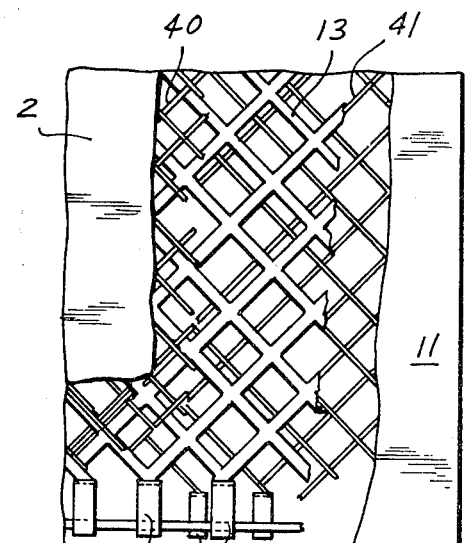

FIG. 6 shows an insulating group within a composite element consisting of the reflector sheet 2, followed by a supporting netting 40; below the latter the chamber-forming spacer 13, and following the latter in its turn a supporting netting 41 and following same finally the sheet 11.

By the arrangement of the supporting nettings 40 and 41 on both sides of the spacer 13, a sinking of the reflector sheets 2 and 11 into the spacing spaces of the radiation chambers is substantially prevented. This all the more effectively since by the tensioning of the reflector sheets and spacers, as well as the supporting nettings, the radiation space is kept free. Tensioning of the spacers, the supporting nettings, etc., is achieved by providing rubber bands 47 which pull said spacers, supporting nettings, etc. tautly apart towards all sides.

In order to be able to effect tensioning of the flexible composite element, stiffening or reenforcing of its edge parts is required. For this purpose the plastic envelopes are so sealed in accordance with FIG. 4 that they form folds 27 into which bars, strips 28, or the like can be inserted. In the same manner, folds are also arranged in vertical direction, said folds being also provided with bars, strips, or the like, and being firmly connected in a frame-like but detachable manner with said horizontal bars or reenforcements. These embodiments of the present invention are especially suitable for tents, wall and ceiling coverings, and floor coverings.

I claim:

1. An insulating flexible composite element comprising at least two spaced walls formed of flexible material having reflecting inner surfaces, said walls being spaced from each other in a shape retaining manner by at least one flexible spacing element formed of a perforated, soft, elastic, heat-insulating material, the perforations in said spacing element each forming a radiation chamber with the opposed walls of said flexible material, said radiation chambers with its reflecting walls and spacing element being enclosed by sheets of flexible material forming an envelope around said flexible walls, said envelope forming a unitary part of the insulating flexible composite element, and means including valves for introducing dry gas into and discharging moist gas from said chambers of said envelope.

2. The composite element of claim 1 wherein said means comprises a first tubular means communicating with the interior of said envelope and perforated in such region for the admission of dry air to the envelope, and second tubular means spaced from said first tubular means and communicating with the interior of said envelope and perforated in such region for discharging moist air from said envelope.

3. The composite element of claim 1 further including air-drying means operatively connected to said first tubular means, and pump means for supplying air through said air-drying means to said first tubular means and thus said envelope.

4. The composite element of claim 3 further including dust filtering means interposed between said pump means and said air-drying means.

5. The composite element of claim 3 further including pump means interconnecting said first and second tubular means for providing air circulation for air drying in said composite element.

* * * * *